May 8, 1962  G. R. RENNER  3,033,622
BUSHING
Filed July 8, 1959

INVENTOR.
Glen R. Renner
BY
C. R. Meland
His Attorney

United States Patent Office 3,033,622
Patented May 8, 1962

3,033,622
BUSHING
Glen R. Renner, Anderson, Ind., assignor to General Motors Corporation, Detroit, Mich., a corporation of Delaware
Filed July 8, 1959, Ser. No. 825,732
1 Claim. (Cl. 308—236)

This invention relates to means for securing a pair of machine parts together such as a shaft and the inner race of a ball bearing.

An object of this invention is to provide a bushing for interposition between two machine parts, the bushing taking the form of a coil spring that provides a tight fit between the machine parts.

Another object of this invention is to provide a bushing for interposition between machine parts that takes the form of a coil spring having individual coils which are polygonal in shape and wherein the corners of the polygon of a respective coil are out of alignment with the corners of the other coils.

A further object of this invention is to provide a ball bearing assembly wherein a coil spring bushing having individual coils formed in a polygonal shape is interposed between the shaft and inner race of the bearing.

Still another object of this invention is to provide a method of forming a coil spring bushing having coils of polygonal shape, the steps including, forming a length of wire into a coil comprised of a plurality of coils each having a polygonal shape with the corners of the polygon of each coil in alignment, and then permitting said coils to unwind to a position wherein the corners of the polygons are misaligned.

Further objects and advantages of the present invention will be apparent from the following description, reference being had to the accompanying drawings wherein preferred embodiments of the present invention are clearly shown.

Figure 1:
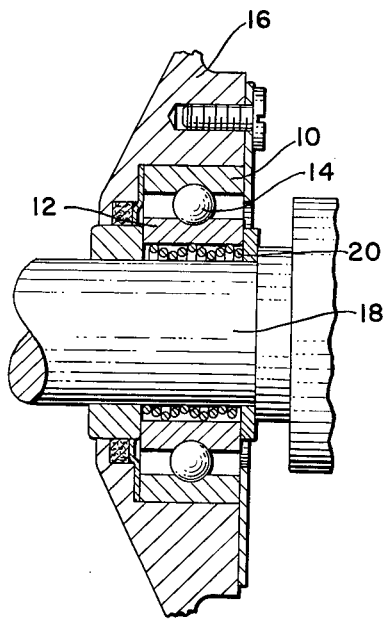
FIG. 1 is a sectional view illustrating the bushing of this invention in position between the inner race of a ball bearing and a shaft.

Referring now to the drawings and more particularly to FIG. 1, a ball bearing assembly is illustrated supporting a shaft. The ball bearing assembly includes an outer race 10, an inner race 12 and a plurality of balls 14 interposed therebetween. The outer race 10 is supported in a member 16 which may be, for example, the end frame of a generator. The inner race 12 of the ball bearing is connected with a shaft designated by reference numeral 18 by a coil spring bushing designated in its entirety by reference numeral 20.

Figure 2:
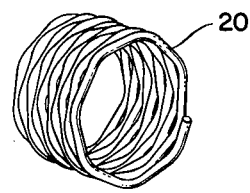
FIG. 2 is a perspective view of the coil spring bushing of this invention.
Figure 3:
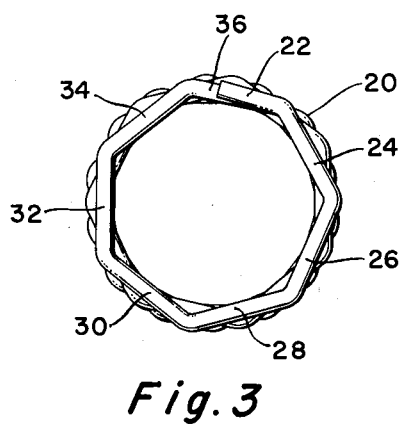
FIG. 3 is an end view of the coil spring bushing made in accordance with this invention.

The coil spring 20 is of a special configuration wherein each coil or convolution of the spring is formed in a polygonal shape. Thus, as is clearly apparent from FIG. 3, the first coil or convolution of the coil spring bushing has flat sides 22, 24, 26, 28, 30, 32, 34 and 36. The coil spring bushing 20 is, of course, helical and one convolution or coil of the spring, as illustrated in FIG. 3, has eight sides so that the coil is octagonal in shape. It is also apparent that the flat sides 22 through 36 of each coil winding or convolution are separated by corners of the octagon. It is also apparent from FIGS. 2 and 3 that the various corners of each coil winding are misaligned so that the coil spring bushing has an exterior that is formed of a plurality of corners or protuberances. The wire for forming the coil spring is formed of resilient material such as music wire.

When the coil spring bushing 20 is interposed between the shaft 18 and the inner race 12 of the ball bearing, a very tight fit is provided therebetween which causes the inner race to rotate with the shaft 18. This tight fit is the result of radial compression of the multitude of corners formed in the coil windings of the coil spring bushing. It has been found that this particular arrangement exhibits good results in cases where the shaft 18 is scored or worn as the coil spring bushing takes up the space between the shaft 18 and the inner race 12 and indentations in the shaft.

Figure 4:
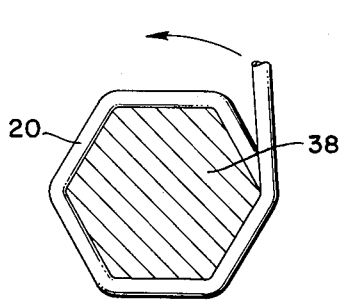
FIG. 4 illustrates one method of manufacturing the coil spring bushing of this invention.

Referring now to FIG. 4, one step in a method of forming the coil spring bushing is illustrated. In this method the spring steel wire is wound on a hexagonal arbor designated by reference numeral 38. When the wire is wound on the arbor 38, it is apparent that each coil or convolution will have a hexagonal shape and that the corners of the hexagon will be in alignment with each other. After winding the wire on the arbor 38, the coil spring is removed from the arbor and permitted to unwind or expand. When the coil winding expands or unwinds, each coil winding or convolution becomes an octagon as is illustrated in FIG. 3 and all of the corners of the octagon are misaligned as is apparent from FIGS. 2 and 3. When the coil winding is permitted to unwind or expand, the angle defined by the corners increases which accounts for the octagonal shape when the coil winding is in the final form shown in FIGS. 2 and 3. It will be readily apparent that the coil winding might be formed in other ways and that the shape of each coil winding or convolution might be other than octagonal. It is important, however, that each coil winding or convolution have corners which are misaligned and which become radially compressed when the coil spring bushing is interposed between a pair of machine parts such as the shaft 18 and inner race 12.

While the embodiments of the present invention as herein disclosed constitute a preferred form, it is to be understood that other forms might be adopted.

What is claimed is as follows:

In combination, a support, a shaft, a ball bearing assembly including an outer race and an inner race interposed between said support and said shaft, and a coil spring bushing interposed directly between and in contact with both said shaft and said inner race, said bushing comprising a helical coil winding having coils which are of a polygonal shape with the corners of the polygon of a coil being misaligned with the corners of an adjacent coil, said bushing throughout its entire length being tightly radially compressed between said inner race and said shaft by virtue of the apices of the polygonal coils being in contact with said inner race and the straight portions of said coils being in contact with said shaft to form a torque transmitting connection therebetween.

References Cited in the file of this patent

UNITED STATES PATENTS

| | | |
|---|---|---|
| 436,256 | McPherson | Sept. 9, 1890 |
| 816,611 | Siegfried | Apr. 3, 1906 |
| 995,531 | Gilbert | June 20, 1911 |
| 1,780,825 | Kuhn | Nov. 4, 1930 |
| 2,458,118 | Tursky | Jan. 4, 1949 |

FOREIGN PATENTS

| | | |
|---|---|---|
| 700,428 | France | Dec. 23, 1930 |
| 29,525 | Holland | Apr. 15, 1933 |
| 151,324 | Australia | May 8, 1953 |